Patented July 31, 1923.

1,463,502

UNITED STATES PATENT OFFICE.

CHARLES C. BUTTENFIELD, OF PITTSBURGH, PENNSYLVANIA.

PISTON AND CYLINDER FITTING COMPOUND.

No Drawing.   Application filed November 22, 1921.   Serial No. 517,075.

*To all whom it may concern:*

Be it known that I, CHARLES C. BUTTENFIELD, a citizen of the United States, residing at Pittsburgh, in the county of Allegheny and State of Pennsylvania, have invented certain new and useful Improvements in Piston and Cylinder Fitting Compounds, of which the following is a specification.

My invention consists of an improvement in piston-and-cylinder fitting compound, for eliminating scored walls or other roughness on the surfaces of either, or on the piston rings, to give a smooth glossy finish, with resulting perfect contact and compression.

Its object is to act as a combination abrasive and lubricant, so that after having performed its abrading function, the abrasive elements will be broken down completely, rendering it unnecessary to remove or wash any part of the compound from the working parts, while continuing to function as a lubricant only.

The present invention is an improvement on, or development of my prior invention, for which I filed an application September 19, 1921, Serial No. 501,836, and each is in certain respects and for certain particular purposes and uses, an improvement on the bearing fitting compound forming the subject matter of Letters Patent No. 1,361,719, issued December 7, 1920, to H. C. Hagmaier, now used and controlled by the present applicant.

I have found by experiment and numerous and various applications in use that the speed and finishing action of a compound of the nature involved, for certain applications, is greatly improved by somewhat radically changing the proportions of the ingredients used, and by eliminating others heretofore used. This is the case only as to such applications as were not contemplated in the prior application and patent above referred to, and it is not to be understood that for certain other applications and uses there should be any material change from the proportions therein given.

In the present case I have found that I can secure results and effects heretofore impossible by limiting the mixture to a suitable abrasive in the form of silica, and a plastic body or binder in the form of white lead. While in some cases it may be desirable to use a slight additional quantity of coloring material in the form of graphite, say 2% to 5%, for the purpose only of contrasting strongly the color of the product with relation to the body or surface of the article being worked upon, so as to show more clearly the progress of the operation, the present invention is not as a rule dependent on the presence of graphite.

I have secured excellent results from a composition made up as follows, it being understood that certain variations in the proportions are allowable within comparatively restricted limits:

Silica _____ 75%
Lead carbonate _____ 25%

When graphite is used as a coloring material and also for its limited finer abrasive action, the proportions should be approximately as follows:

Silica _____ 71% to 73%
Lead carbonate _____ 24% to 25%
Graphite _____  5% to 2%

The silica acts as the chief abrasive and should be of various degrees of fineness in order to provide for the several successive grades of action in the entire mass. I therefore utilize a mass of silica made up of the following several sizes and in the quantities noted, so as to provide for very coarse, coarse, medium, fine, and very fine, to wit:

Silica of 40 mesh _____  5%
Silica of 60 mesh _____  5%
Silica of 80 mesh _____ 15%
Silica of 100 mesh _____ 50%
Silica of 200 mesh _____ 25%

The silica is preferably substantially pure commercial silica having the usual qualities as to sharp abrasive action and comparatively fine in grain, that is to say, dependent upon the particular use to which the compound is to be put for its action on cylinder walls, pistons, and piston rings, or other parts.

The white lead or lead carbonate is the usual white lead of commerce and acts as a plastic body and binder for the contained ingredients. The lead serves as a vehicle for the abrasive and also acts to break down the abrasive as the work progresses.

This compound is used as follows:—Use approximately one teaspoonful (more or less) for each cylinder. Mix this with lubricating oil to the thickness of paint. It is preferable to use a common paint brush so as to thoroughly coat each piston with this mixture just before assembling the cylinder block and pistons. In case the motor is revolved with external power with the crank case off, it will be necessary to add oil to the cylinders through the spark plug holes. In case the motor is completely assembled it is not necessary to add any oil, provided the crank case is well supplied. In no case is it necessary to remove any of the compound remaining in any part of the motor as it will have been completely broken down and will not do any harm to any part of the machinery in any manner, shape or form. After between one and two hours running of the motor, either under its own power or under external power, the cylinder walls will have a perfect gloss, the pistons will be absolutely smooth, the rings will be seated perfectly, and thus perfect compression will result.

The advantages of the invention will be understood and appreciated by all those familiar with the use of internal combustion and other engines. It is cheap and efficient in manufacture and use, and easily applied without previous experience or special skill.

What I claim is:

1. A piston-and-cylinder fitting compound composed of about three-fourths of silica graded to 5% of forty mesh, 5% of sixty mesh, 15% of eighty mesh, 50% of one hundred mesh, and 25% of two hundred mesh, and about one-fourth of lead carbonate.

2. A piston-and-cylinder fitting compound composed of silica and lead carbonate in substantially the proportions set forth, mixed together with a suitable oil content, as described.

In testimony whereof I hereunto affix my signature.

CHARLES C. BUTTENFIELD.